Sept. 24, 1940.    C. E. MASON    2,216,039
CONTROL APPARATUS
Filed July 31, 1935    8 Sheets-Sheet 1
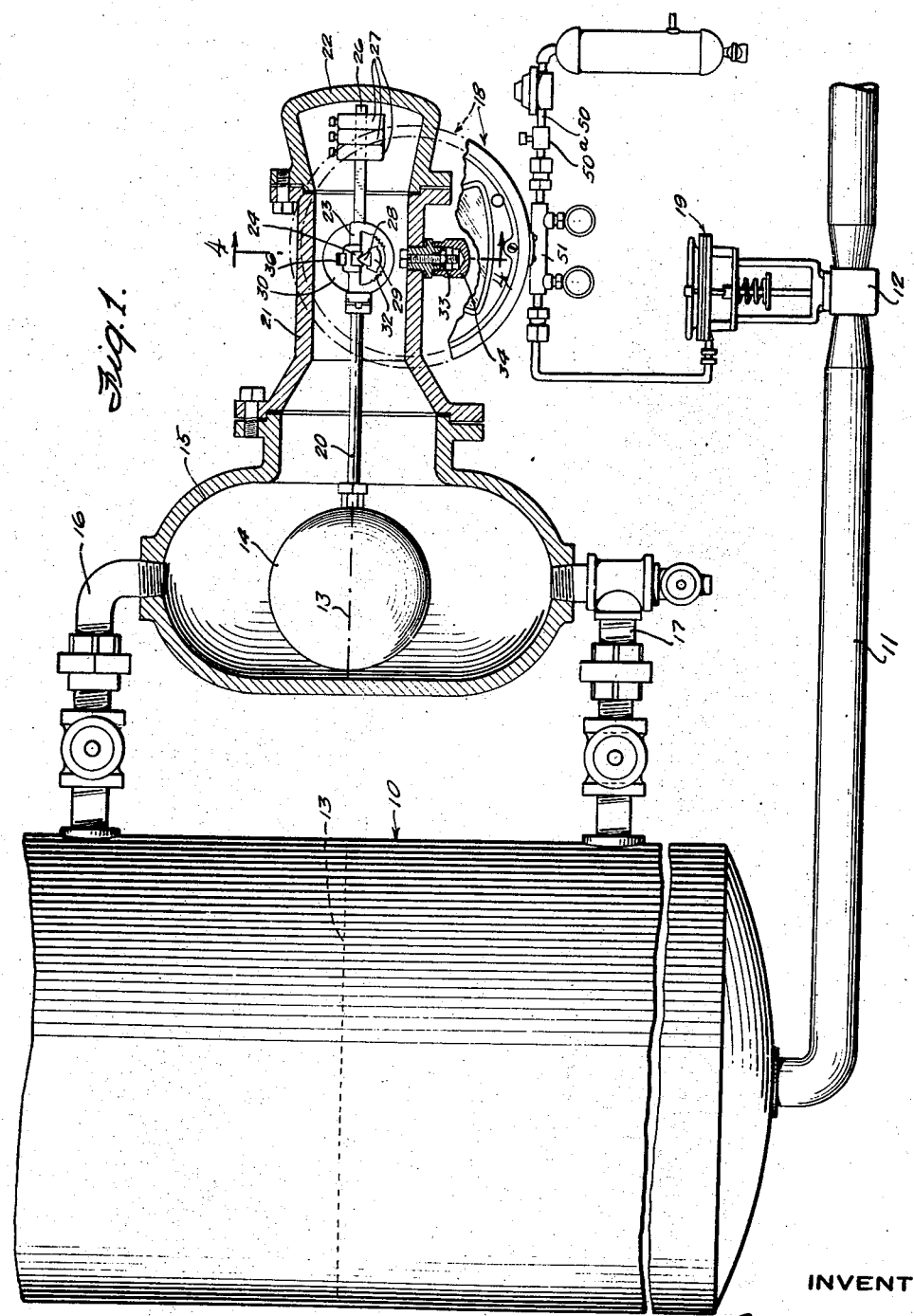
INVENTOR
CLESSON E. MASON
Blair, Curtis + Dunne
BY his ATTORNEYS Sept. 24, 1940.   C. E. MASON   2,216,039
CONTROL APPARATUS
Filed July 31, 1935   8 Sheets-Sheet 2
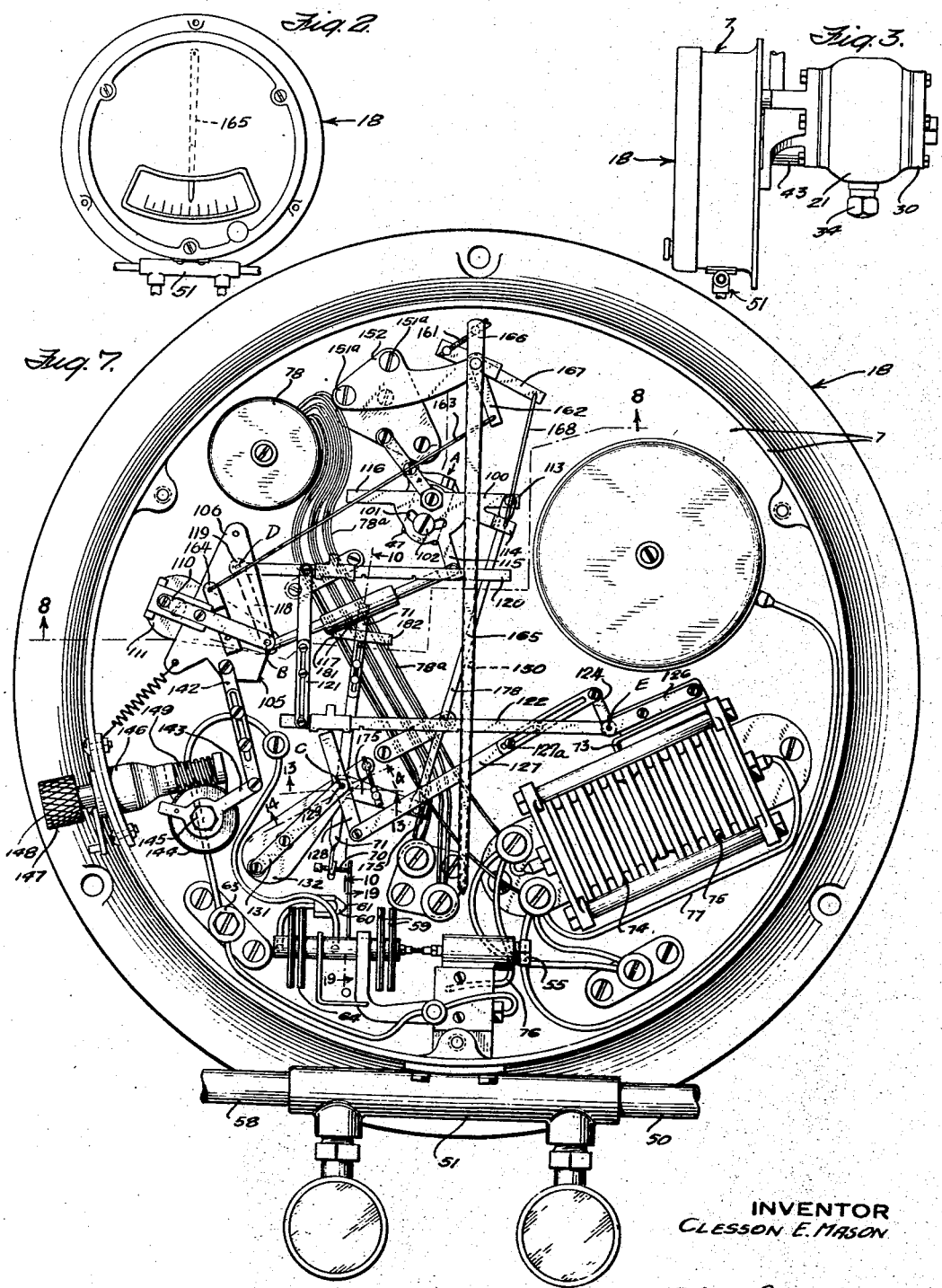
INVENTOR
CLESSON E. MASON
BY his ATTORNEYS Sept. 24, 1940.   C. E. MASON   2,216,039
CONTROL APPARATUS
Filed July 31, 1935   8 Sheets-Sheet 3
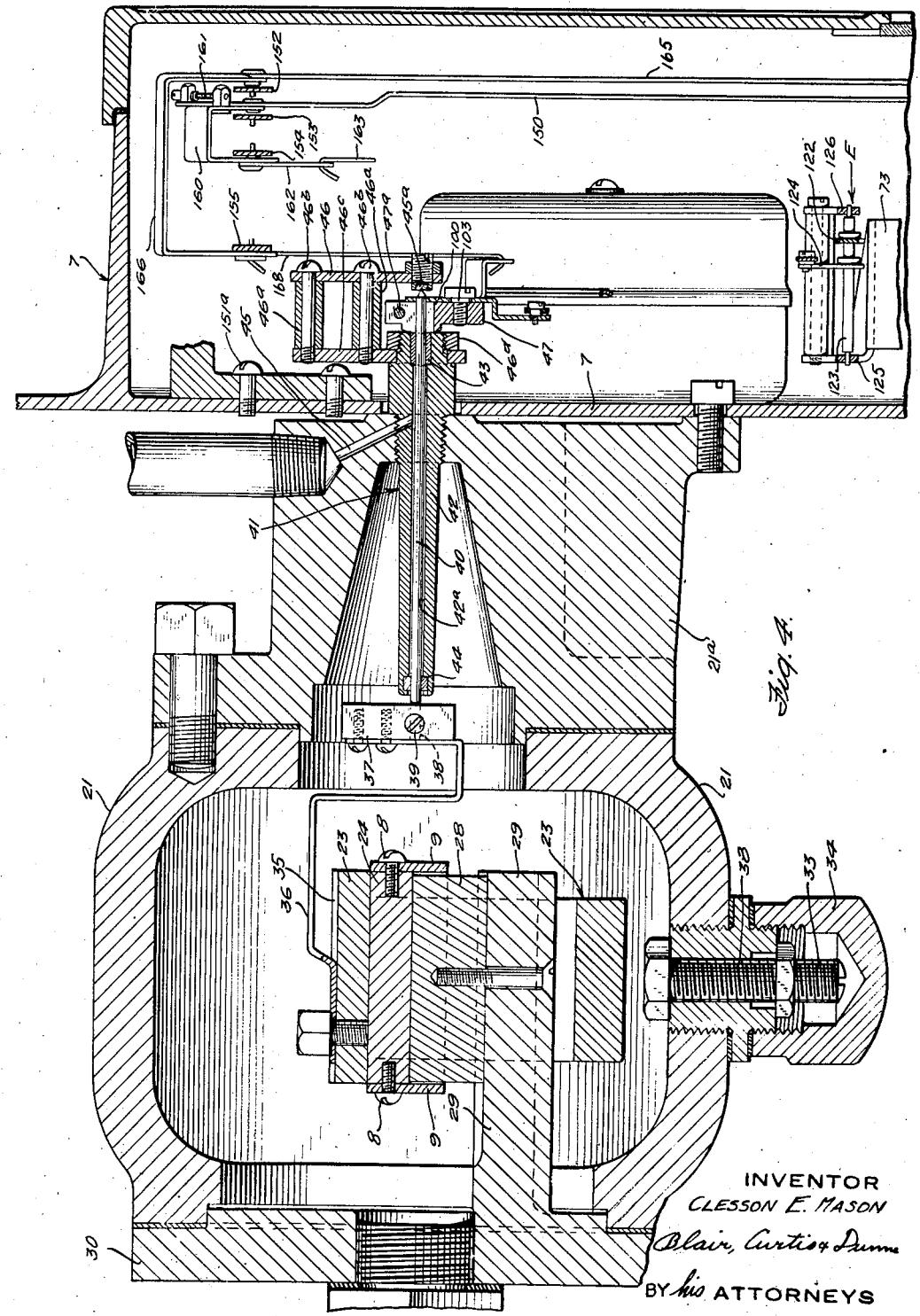
INVENTOR
CLESSON E. MASON
Blair, Curtis & Dunne
BY his ATTORNEYS Sept. 24, 1940.  C. E. MASON  2,216,039
CONTROL APPARATUS
Filed July 31, 1935  8 Sheets-Sheet 4
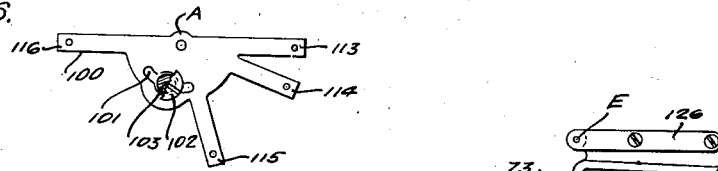
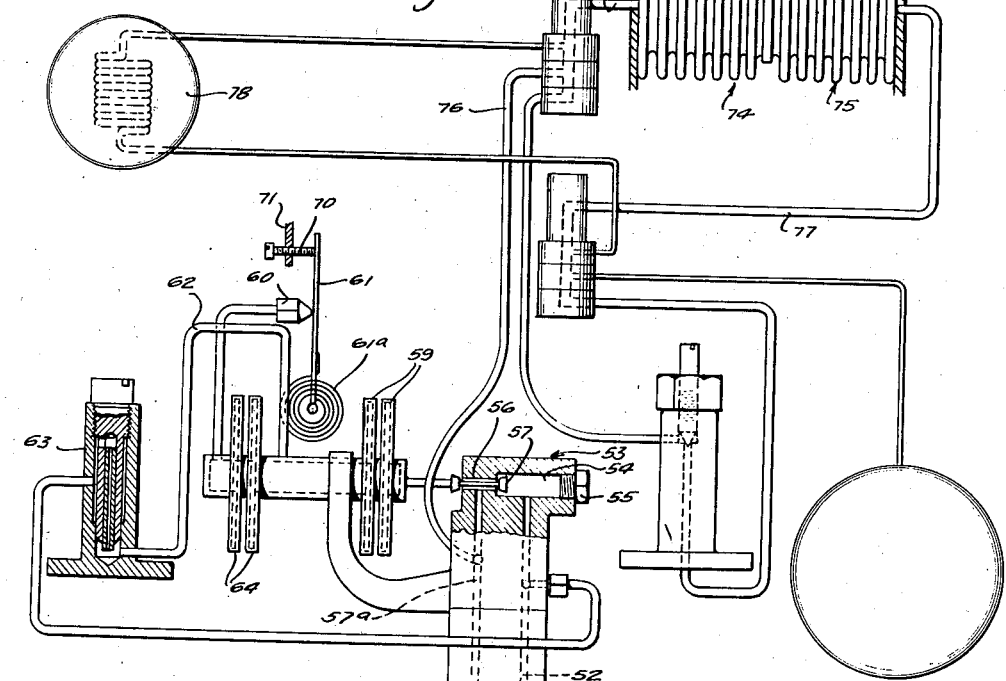
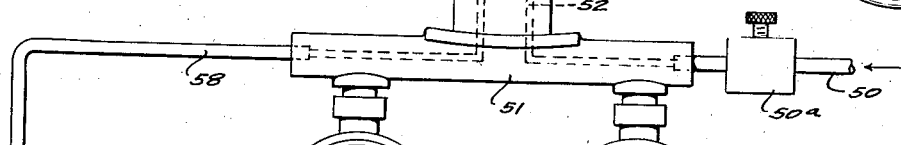
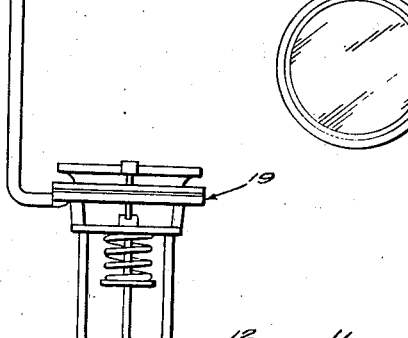
INVENTOR
CLESSON E. MASON
Blair, Curtis & Dunne
BY his ATTORNEYS Sept. 24, 1940.  C. E. MASON  2,216,039
CONTROL APPARATUS
Filed July 31, 1935  8 Sheets-Sheet 5
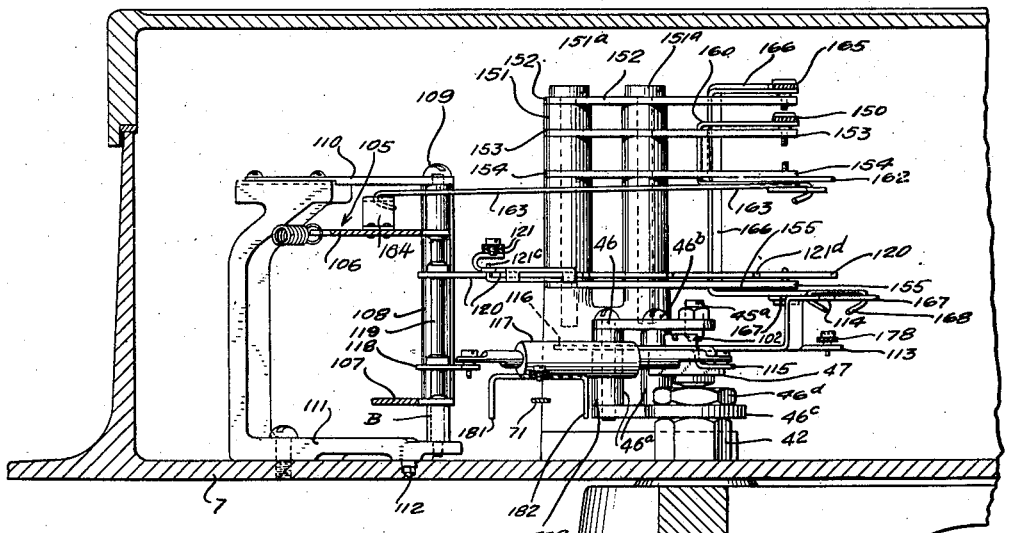
Fig. 8.
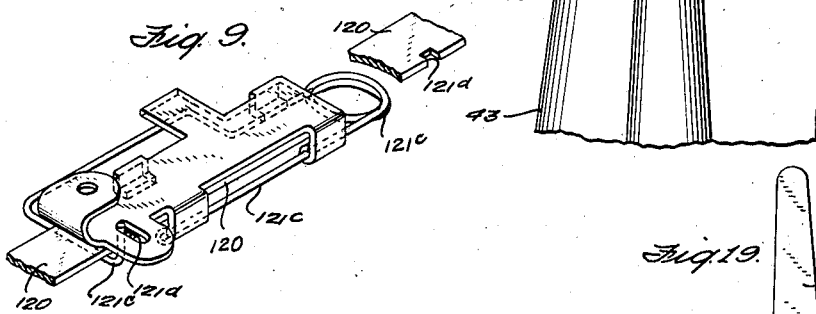
Fig. 9.
Fig. 19.
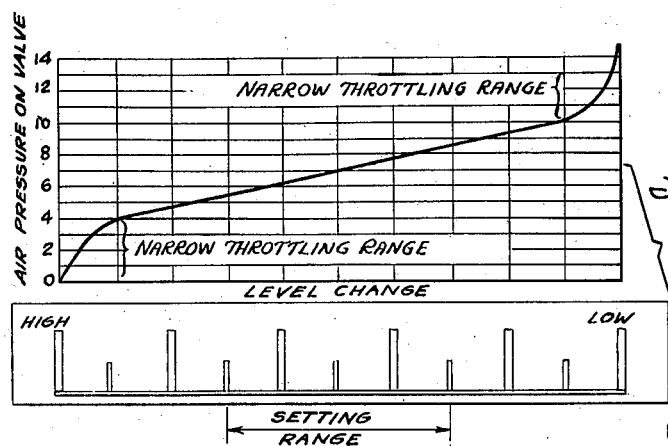
Fig. 20.
INVENTOR
CLESSON E. MASON.
BY his ATTORNEYS

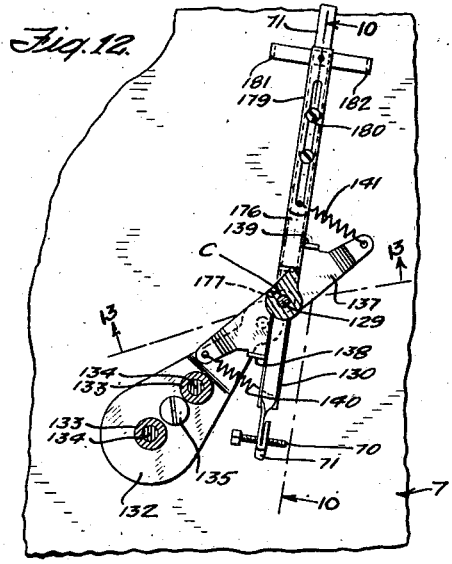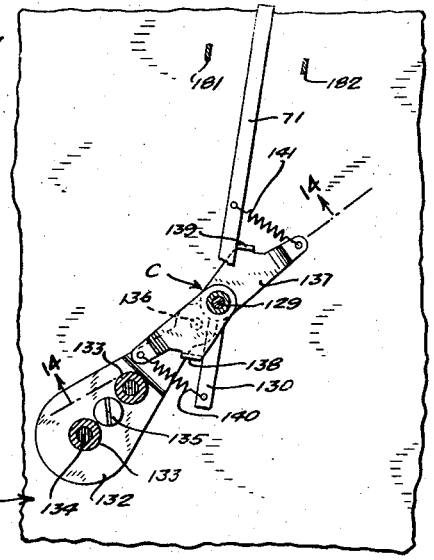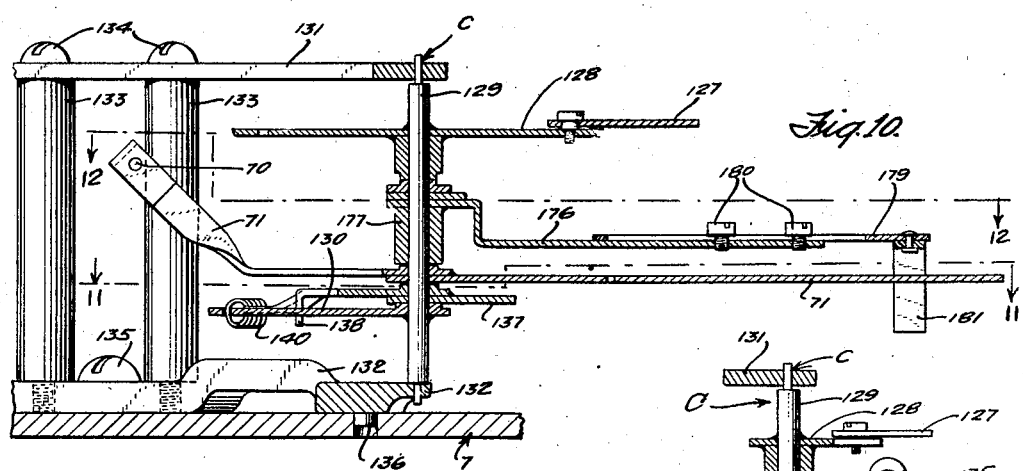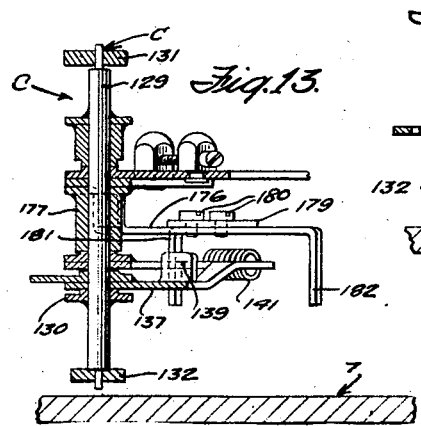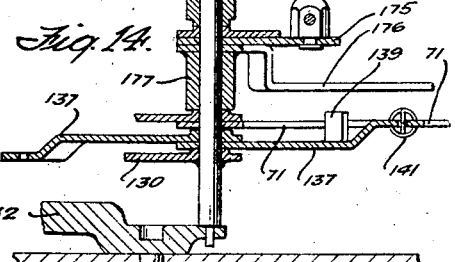

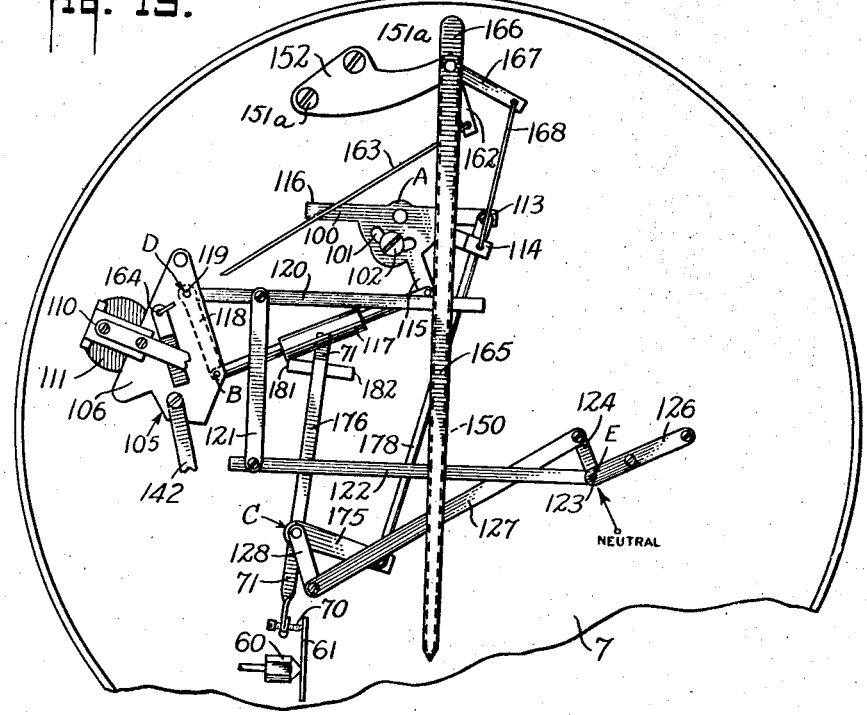

Sept. 24, 1940.　　　　C. E. MASON　　　　2,216,039
CONTROL APPARATUS
Filed July 31, 1935　　　8 Sheets-Sheet 8
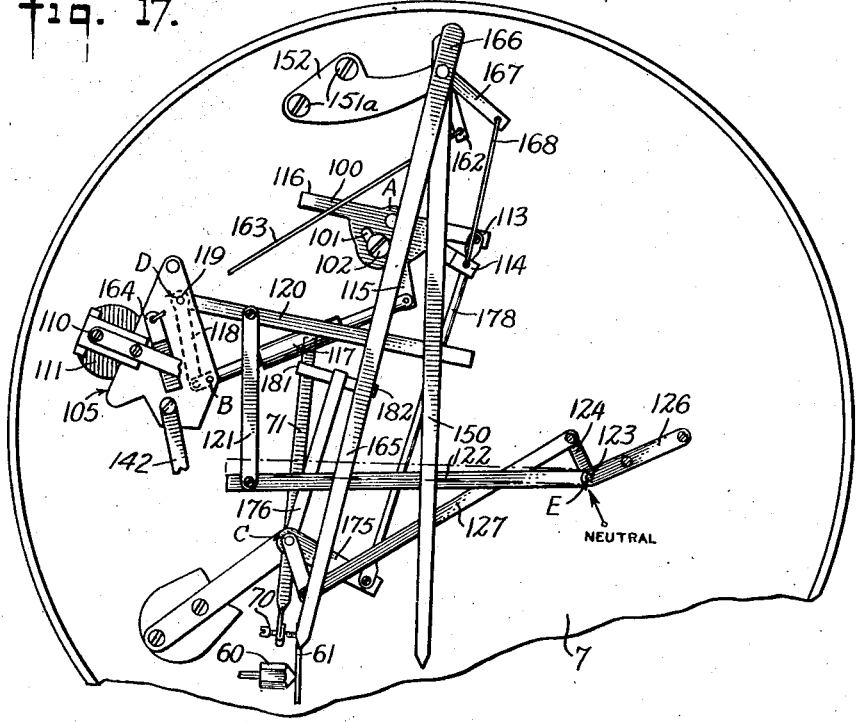
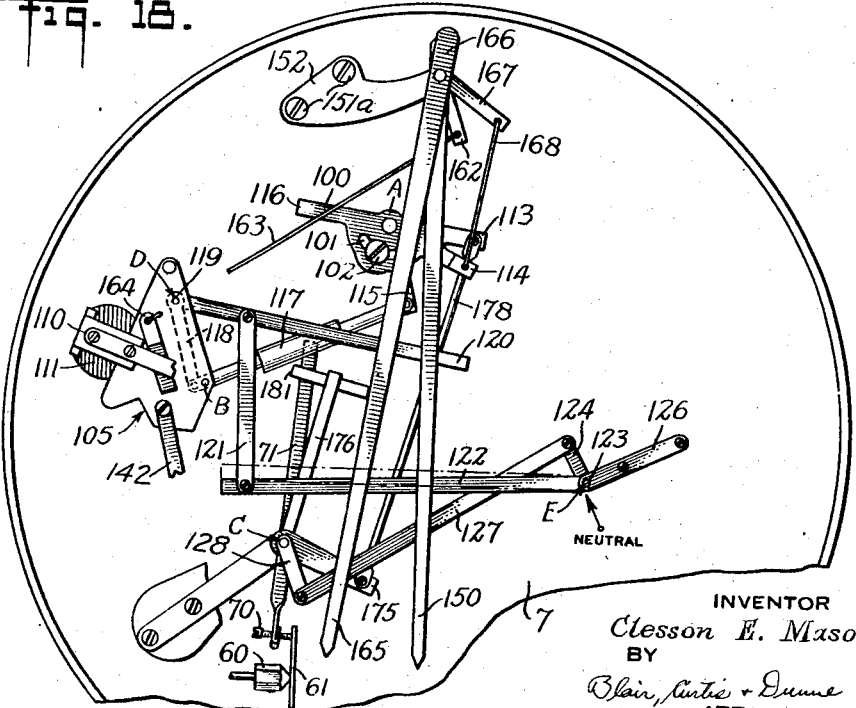
INVENTOR
Clesson E. Mason
BY
Blair, Curtis + Dunne
ATTORNEYS Patented Sept. 24, 1940

2,216,039

UNITED STATES PATENT OFFICE 2,216,039

CONTROL APPARATUS

Clesson E. Mason, Foxboro, Mass., assignor to The Foxboro Company, Foxboro, Mass., a corporation of Massachusetts Application July 31, 1935, Serial No. 34,111

20 Claims. (Cl. 137—68)

This invention pertains to control mechanism. The embodiment chosen to illustrate the invention is shown as particularly adapted for controlling the liquid level in a container by varying quantities which determine the value of the liquid level.

It is an object of the invention to provide control mechanism which will efficiently accomplish such a control.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown one or more of the various possible embodiments of this invention—

Figure 1 shows in vertical section a housing for a ball-float (shown in elevation) for indicating the liquid level in a tank. Control mechanism associated with the float and located in front of the float mechanism is not shown in this figure;

Figure 2 is a front elevation of the exterior of the casing containing the control mechanism;

Figure 3 is a right side elevation of the casing;

Figure 4 is an enlarged vertical section taken through line 4—4 of Figure 1 showing in vertical section parts of the control mechanism;

Figure 5 is a diagrammatic flow sheet of the pneumatic control system operated by the control mechanism;

Figure 6 is a detail view of a distributing link of the mechanism shown in Figure 7;

Figure 7 is an enlarged front elevation of the control apparatus in the casing shown in Figure 2, the cover being removed;

Figure 8 is a horizontal section taken on the line 8—8 of Figure 7;

Figure 9 is a detail of a slidable connecting clip;

Figure 10 is a vertical section taken on line 10—10 of Figure 7;

Figure 11 is a section taken on line 11—11 of Figure 10;

Figure 12 is a section taken on line 12—12 of Figure 10;

Figure 13 is a section taken on line 13—13 of Figure 7;

Figure 14 is a section taken on line 14—14 of Figure 7;

Figure 15 is a view showing linkage mechanism of apparatus shown in Figure 7 with other parts omitted;

Figures 16, 17 and 18 are views similar to Figure 15 showing the parts in different positions;

Figure 19 is a section on line 19—19 of Figure 7.

Figure 20 diagrammatically shows the range of the wide throttling and narrow throttling control changes which may be indicated by the scale shown in Figure 2.

Corresponding reference characters refer to corresponding parts throughout the several views of the drawings.

Referring to Figure 1 there is shown at 10 a tank such as might be used in an industrial process. Liquid flows to the tank through a pipe not shown. A valve 12 in line 11 regulates the flow of the material from the tank.

In the present embodiment the liquid level indicated at 13 is measured by a ball-float 14 mounted in a float chamber 15 connected into the tank through pipes 16 and 17. The position of the ball-float is determined by the liquid level in the tank and is transmitted to control mechanism (Figure 2) contained in casing generally indicated at 18 which control mechanism through a pneumatic system operates a diaphragm motor generally indicated at 19 which operates the valve 12. The control mechanism employs the principles described in my Patent No. 1,897,135, issued February 14, 1933, which patent reissued as Reissue No. 20,092 on September 1, 1936.

It is desirable to have the control mechanism immediately responsive to minute changes in the liquid level, and to this end the entire mechanism should be free from such frictional resistance as would prevent it from responding to movement of the ball-float or would prevent the ball-float from responding to movement of the liquid level. Further, it is often desirable in controlling liquid levels to have either a relatively wide throttling range so that the liquid level may be permitted to vary considerably without changing the flow appreciably, or a narrow throttling range wherein the level would be maintained substantially constant but the flow would be varied widely to maintain the level constant. These desirable features are accomplished in the present invention.

Referring to Figure 1, the ball-float mechanism comprises the float, a rod 20 secured at one end to the float and at the other to a rack 23, and a counterweight rod 26 secured to the rack. The whole is mounted in the float chamber and a casing formed by sections 21 and 22 suitably held together by bolts and gaskets to provide a fluid tight structure. Rack 23 is cut out to receive a hardened notched supporting member 24. Adjustable counterweights 27 are carried by rod 26.

This assembly is supported by a knife edge 28 (Figure 4) mounted on a shelf 29 extending into the casing from a cover plate 30. Projecting downwardly from the sides of the rack are guide plates 9 suitably held in place by screws 8 to keep the rack from inadvertently sliding out of position with respect to the knife. The edge of the knife 28 sitting in the notched member 24 provides a pivotal substantially frictionless support for the float assembly, the ball 14 being free to change its position with slight changes in the liquid level. As shown, a swing of 30° (15° either side of the normal level) is permitted. The counterweights 27 may be adjusted along the rod 26 to adapt the float to liquids of varying specific gravities.

To aid in shipping of the instrument the lower inside surface of the rack 23 is notched as shown at 32. Before shipping, a bolt 33 is threaded up to clamp the rack 23 against the lower edges of the shelf 29 which are so constructed as to mesh with notches 32. Bolt 33 is covered by cap 34 so that when the bolt is withdrawn from clamping position after the apparatus has been installed the assembly may be made leak-proof by tightening the cover cap 34.

Referring to Figure 4, mechanism for transmitting the rotational movement of the ball-float to the control mechanism is shown. Secured to the top of rack 23 and positioned in a groove 35 extending across the rack parallel with the knife edge, is a resilient connecting link 36. The link is bent so that its other end may be secured by suitable screws to a split block 37 provided with a hole 38, the axis of which is approximately coincident with a line containing the knife edge. Block 37 is secured to a shaft 40 (by clamping screw 39) freely supported in a pressure tight bearing generally indicated at 41, which in the present embodiment includes an outer supporting casing 42 having a bore 42a and threadably mounted in a block 21a secured to casing 21. The casing 42 carries at its right end a bushing 43 forced into the bore 42a. At the left end the bore 42a is provided with a bushing 44 suitably held in place. The shaft 40 is preferably of a hardened material accurately machined as are the bushings. The bore of the bushing 43 is preferably machined to the same diameter as the shaft. The bushing 44 is provided with a bore to give the usual clearance between it and the shaft 40. The shaft 40 is slipped through bushing 44 and ground into bushing 43 with a suitable grinding operation so that the clearance between the shaft and bushing is very small. A lubricating film is maintained between the shaft and bushing by forcing lubricant under pressure through a passage 45 communicating with the interior of the casing 42. The small clearance between the shaft and bushing 43 prevents undesirable flow of the lubricant from the right end of the bearing assembly. The process pressure is usually sufficient to prevent flow from the left end.

As shown in Figure 4, the pressure bearing assembly extends forwardly through the back of housing 7 in which the control mechanism is located and to which the ball-float mechanism casing is suitably bolted. Mounted on shaft 40 is a split block 47 which is clamped to the shaft by tightening a screw 47a in the block. The back side of the block has a curved, convex surface for providing a suitable contact with bushing 43 to limit the axial movement of shaft 40 in one direction. The axial movement of shaft 40 is limited in the other direction by means of a jewel bearing stop 45a, adjustably mounted on arm 46 supported by sleeves 46a and bolts 46b and a supporting member 46c. The supporting member 46c is supported by and locked to casing 42 by a nut 46d threaded on to the casing. The adjustments are preferably made to allow slight axial play of the shaft 40.

The axes of the various parts making up the substantially frictionless pressure tight bearing are coincident with a line containing the knife edge 28 so that as the ball-float pivots about the knife edge its rotational movement is transmitted to the split block 47 without creating any undesirable pressure between the parts that would produce friction. The resilient connection 36 between the float and shaft furthers the assurance against any such forces coming into existence.

With this construction slight movements of the ball are not resisted and are transmitted freely and accurately to the shaft 40 and block 47. The weight of the relatively heavy ball-float assembly is carried by the liquid in chamber 15 and by the knife edge which affords a substantially frictionless pivotal support. The motion of the ball-float assembly is transmitted through the resilient member 36 and the mounted shaft 40 to the block 47.

Control mechanism

As above mentioned the measurements made by the liquid level mechanism are transmitted to a control mechanism which through motor 19 positions valve 12. The principles employed in the control mechanism are described in the above mentioned Patent No. 1,897,135 and only a brief description of the pneumatic system and general operation will be described here. The details of the control mechanism are being covered in my copending application Serial No. 226,622, filed August 25, 1938.

Referring to Figure 5, there is generally indicated at 53 a control head. The control head is connected through a pipe 50 with an air supply not shown. A reducing valve diagrammatically shown at 50a is provided in pipe 50 to adjust the air pressure under which the control mechanism operates. The pipe 50 connects with a header 51 and port 52 shown in dotted lines in the header. The port 52 terminates in a chamber 54 plugged at the right end by a plug 55. The left end of the chamber connects with a passage 56 communicating at its other end with the atmosphere. The passage 56 also connects with a port 57a and supports a double headed valve 57. In its extreme right position valve 57 closes passage 56 from the atmosphere and in its extreme left position opens the passage to the atmosphere but completely closes it from chamber 54. Port 57a is connected by pipe 58 to diaphragm motor 19. Thus when the valve is in the extreme left position the diaphragm motor is connected with the atmosphere and when the valve is in its extreme right position the diaphragm motor is connected with the chamber 54 and full line pressure in port 52. Thus, by suitable operation of the instrument, as will be described, the pressure on the diaphragm motor may be varied from zero to the maximum pressure in the supply line.

The valve 57 is positioned by the bellows 59 which expand to move the valve to the right with increasing pressure and collapse to move the valve to the left with decreasing pressure.

The pressure in the bellows is controlled by a pneumatic control couple comprising a nozzle 60 and flapper 61. Nozzle 60 is connected to the supply port 52 by pipe 62, having a restricting tube 63 to regulate the flow of gas to the nozzle. The nozzle is mounted on a bellows 64 connected to the pressure in the pipe 62. The pressure in the line 62 is varied by the relative positions of the nozzle 60 and flapper 61.

When the flapper covers the nozzle opening, a maximum back pressure starts building up in the line 62 and bellows 59. When the flapper is moved away from the nozzle 60, the pressure in the line 62 and bellows 59 starts decreasing. When the flapper 61 is moved away from the nozzle beyond a certain limited distance, the back pressure in line 62 and bellows 59 decreases to a certain minimum back pressure. For various intermediate relative positions of the nozzle and flapper, the back pressure in line 62 and bellows 59 balances to various values intermediate the maximum and minimum back pressures.

In the present embodiment when the flapper and nozzle are separated beyond approximately a thousandth of an inch, the back pressure in line 62 and bellows 59 decreases to the minimum back pressure above referred to. Thus the range of movement of the flapper with respect to the nozzle, for establishing the said intermediate back pressures, is approximately one thousandth of an inch.

The relative position between the nozzle and the flapper varies as described in Patent No. 1,897,135. The control mechanism shown in Figure 7 is adapted to accomplish this. Referring again to the diagrammatic flow sheet (Figure 5) and to Figure 19, flapper 61 is held against a stop screw 70 by a hair spring 61a. The screw is adjustably mounted in a pivoted lever 71 which is positioned through mechanism not shown in the flow sheet by element 100 attached to block 47 and shaft 40 which are rotated by the ball-float, and by a rack 73. The rack 73 is mounted between opposing bellows 74 and 75. When equal pressures exist in the bellows, the rack assumes a neutral position, but if the bellows 74 has a pressure within higher than the pressure in bellows 75, the rack is shifted to the right an amount corresponding to the pressure difference. If bellows 75 has a pressure within higher than the pressure in bellows 74, the rack is shifted to the left of neutral position an amount corresponding to the pressure difference. The movements of the condition sensitive element 100 and the rack 73, through the linkage mechanism, are algebraically added and the sum of the movements is transmitted to lever 71 and to the flapper 61.

As shown in the present embodiment bellows 74 is connected through pipe 76 with port 57a in the control head 51 which port also communicates with pipe 58 and the diaphragm motor. Thus, the pressure in bellows 74 is the same as that existing in the diaphragm motor.

Bellows 75 and bellows 74 are connected by means of tubing contained in a housing 78. The tubing has a capillary bore and serves to restrict the flow of gas from or to bellows 75 so that changes in pressure in the bellows 74 due to changes in position of the valve 57 only gradually are transmitted to the bellows 75 as the equalizing pressure seeps through the capillary tubing. Several lines of capillary tubing are usually provided so that more or less capillary tubing can be inserted between the bellows 74 and 75, depending upon the nature of the process being controlled. As shown in Figure 7, the capillary tubes have leads 78a which may be connected with one another through the couplings shown. Varying relative pressures in the bellows 74 and 75 position the rack 73 as fully described in Patent No. 1,897,135.

Connected to line 77 and 78a by means of piping or tubing 77b is a chamber 77a. This chamber gives additional capacity to the bellows 75 when needed.

The linkage for transmitting to the flapper the motions of changes in position of the condition sensitive element and changes in the position of the rack without undesirable frictional resistance or lost motion is shown in Figures 7 through 18.

Referring more particularly to Figures 6 and 7, on block 47 is mounted a distributor link 100 having a hole for receiving the end of shaft 40, and a curved slot 101 provided with an enlarged cut out portion as shown in Figure 6. A screw 102 threaded into block 47 clamps the distributing link in place. The screw has a shoulder 103 which meshes with the enlarged part of the slot to align the link with the block. Thus the link assumes positions corresponding to position of the ball-float. Axis A coincident with the axis of shaft 40 forms one fixed fulcrum of the lever mechanism. Another fixed point of the lever mechanism is shown at B (Figures 7 and 15), about which point a frame, generally indicated at 105 (Figure 8) is pivoted. The frame comprises an outer plate 106 and an inner plate 107 held together by spacing sleeves 108 and screws 109. The frame is suitably pivoted between two arms 110 and 111, the arm 111 being secured to the back of the casing 7 by a screw and a projection 112 extending into a hole in the back of the casing.

A third fixed fulcrum of the lever mechanism is shown at C about which the flapper operating lever 71 pivots.

Main movable or adjustable fulcrum points are also provided in the mechanism, one of them generally indicated at D is mounted on the frame 105. The other generally indicated at E is mounted on rack 73 supported by bellows 74 and 75.

The distributing link 100 has four arms (Figs. 6 and 7) 113, 114, 115 and 116. Arm 115 which extends generally parallel to a link passing between points D and B when the control point is substantially central is connected by means of a resilient link 117 with one arm 118 of a bell crank (Figure 8) comprising the arm 118, a shaft 119 and an arm 120. The arms 118 and 120 are securely attached to the shaft 119 which is mounted between the plates 106 and 107 of frame 105. The link 117 although normally of a predetermined length is made resiliently contractable so that in the event of unusual movement of the distributing link 100 undue strain will not be placed on the mechanism but will be absorbed by the resiliency of the link 117.

Pivotal movement of link 100 is thus transmitted to arm 120. Linked to arm 120 by means of connecting link 121 is another bell crank comprising arm 122, spindle 123 and arm 124, the arms 122 and 124 being rigidly secured to the spindle 123 which is mounted between arms 125 and 126 (lower right hand corner of Fig. 4) of the rack supported by the bellows. Thus movement of the arm 120 is transmitted to arm 124.

Connected to arm 124 by means of connecting link 127 is another bell crank comprising a double ended arm 128, shaft 129 Figure 10, and arm 130, arms 128 and 130 being secured to the shaft which is pivotally mounted between supporting bars 131 and 132, which bars are rigidly spaced from one another by means of spacing sleeves 133 and held together by screws 134. A screw 135 serves to mount bar 132 on the back of the casing and a projection 136 accurately aligns the bar with the casing. It is noted that the axis of the shaft 129 is coincident with the fixed fulcrum point C.

With the linkage as described pivotal movement of shaft 40 and distributing link 100 is transmitted to bell crank arm 130.

By the mechanism shown in Figures 10, 11, 12, 13 and 14, the motion of bell crank arm 130 is resiliently transmitted to the long lever 71 freely mounted on spindle shaft 129 by means of a lever 137 also freely supported on the spindle 129 and having an inwardly projecting lug 138. Arm 130 is resiliently held against the inwardly projecting lug 138 by means of a light coil spring 140 and lever 71 is resiliently held against the outwardly projecting lug 139 by means of light coil spring 141. Thus movement of lever 130 clockwise positively drives lever 137 through the lug 138 but only resiliently drives lever 71 through spring 141. Movement of lever 130 counter-clockwise resiliently pulls lever 137 in the same direction which positively drives lever 71 in the same direction. Lever 71 however is free to move about the spindle 129 in either clockwise or counter-clockwise direction without moving arm 130.

Thus the lever 71 is mechanically though resiliently linked to the shaft 40 and to the rack 73. As shown in Figures 7 and 15 through 18, the linkage mechanism is so adjusted that a relatively large movement of the shaft 40 and distributing link 100 produces only a relatively small movement of the arm 122. Thus, an appreciable change in the liquid level in the container would cause only a relatively small correction to be made by the control mechanism to the setting of the valve motor 19.

When the above described mechanism is in operation, any movement of the flapper produced by movement of the ball float, acting through the distributing link 100, which would tend to cover or uncover nozzle 60 affects the pressure in throttling bellows 74 to move the rack 73 and point E to move the flapper back to a position just tangent to the nozzle. This "primary reaction" is such that the flapper is maintained tangent to the nozzle by change of the position of the rack 73 and is such that the quantity change in pressure in bellows 74 is proportional to the change in the ball float position.

In addition to this "primary reaction" there is a "secondary reaction" produced by the reset bellows 75. Bellows 75 opposes bellows 74 and has a pressure connection with bellows 74 through the capillary tubing 78. Thus a differential in pressure between the bellows 74 and the bellows 75 produces a rate of change of pressure in the bellows 74 which is directly proportional to the difference of the pressures.

When the ball float and distributing link 100 are stationary and there is a rate of change of pressure in the bellows 75 the same rate of change of pressure occurs in the bellows 74. This is due to the primary reaction which holds the flapper tangent to the nozzle which requires that the same differential in the pressures exist between bellows 74 and 75 so long as the ball float and distributing link 100 are stationary.

At one particular position of the ball float and distributing link 100, the flapper will be held tangent to the nozzle with zero pressure differential between the bellows 74 and 75. That is, the pressures in the bellows are equal and there is a zero rate of change in both bellows 74 and 75 and the value of the pressure in the bellows may be of any value between zero and a full supply of pressure. This position of the ball float and distributing link is the control point of the air-operated control mechanism.

A rate of change of pressure in the bellows 75 is produced by a deviation of the ball float and distributing link from this control point and the value of the rate of change of pressure in the bellows 75 for a given capillary resistance 78 is proportional to this deviation. The rate of change of the pressure in bellows 75 is positive when the deviation of the ball float is produced by a high liquid level and is negative when the deviation of the ball float is produced by a low liquid level.

The primary reaction tends to produce decreased pressure in the bellows 74 when the ball float is below the control point, whereas a positive rate of level change produces a positive rate of pressure change in the bellows 74. The secondary reaction tends to produce a positive rate of change for a deviation of the ball float above the control point. Therefore the primary and secondary reactions together will cause the actual pressure in bellows 74 to be the algebraic sum of these two effects. The pressure in bellows 74 may be increasing, decreasing, or standing still, dependent on the rate of change of the level at certain deviations and will always have zero rate of change when the control point is reached. Since it is desirable that any changes in the rate of flow from the tank 10 should behave in accordance with the same general characteristics as the pressure in bellows 74, the pressure in bellows 74 is used as the operating pressure of the valve motor 19.

As explained above, any equal pressures from zero to a full supply of pressure may exist in the bellows 74 and 75 when the rack 73 is in its neutral position and the ball float at its control point.

As described above, an instrument set-up as shown in the drawings has a wide throttling range so that a rising liquid level produces only a relatively small corresponding increasing of the pressure in bellows 74. The instrument thus adjusted can be used for maintaining the flow from the container approximately constant, i. e., without wide variations or surges in the flow in line 11, while at the same time always correcting the flow in the direction to correct for variations in the liquid level.

The control point at which the level is maintained or at which the instrument is set to maintain the level is manually adjustable by shifting the position of the fulcrum D. This is accomplished by pivoting frame 105 about its pivotal support to shift bodily the fulcrum of bell-crank 118, 119, 120. The shifting of the frame is accomplished through a connecting link 142 attached at one end to outer plate 106 and at the other end to a crank arm 143 secured to a bevel gear wheel 144 carried on a shaft 145 mounted on a frame 146 suitably supported on the wall of the casing. Rotation of gear 144 to swing crank 143 to shift the position of frame 105 is accomplished by turning a knurled knob 147 extending from a shaft 148 to the outside of the casing. The inner end of the shaft carries a worm gear 149 for driving gear 144.

The position of frame 105 and of the point at which the mechanism is set to maintain the liquid level is indicated by means of a pointer 150 (referring to Figures 7, 8 and 15) mounted on U-shaft 160 which swings from supporting arms 153, 154. These supporting arms are carried by posts 151 secured by screws 151a on the back of the casing. A connecting screw 161 is provided for adjusting the angular position of pointer 150 and the front leg of the U-shaft 160. Secured to the inner arm of the leg 154 of the U-shaft 160 and in properly adjusted relationship with respect thereto is a lever 162 connected by means of a wire link 163 with a raised projection 164 extending from the outer plate of frame 105.

The position of the ball-float and the shaft 40 and distributing link 100 is indicated by pointer 165 rigidly secured to U-shaft 166 which is pivotally mounted on arms 152 and 155. To the inner arm of the U-shaft 166 is secured in properly adjusted position with reference thereto the pivot point lever 167 which by means of a wire link 168 is connected to arm 114 of distributing link 100.

As shown in Figure 7, the various links and connections are preferably so related and proportioned with respect to each other that when the control point is in the middle of the operative control range of the instrument, the pivot point between the connection 117 and the bell crank arm 118 is coincident with the axis B so that adjustment of the control point above or below the mid-position produces a minimum angular change in the linkage mechanism and connections and so that such change as is produced by such adjustment is the same whether the control point be set up or down. In the mid-position of adjustment, too, it is preferable that the angle formed between the respective arms 115 and 118 and their connecting link 117 be substantially 90° so that a unit rise or fall of the liquid level produces the same motion of the bell crank 118—120.

The linkage mechanism as shown in Figure 7 for transmitting movement of the shaft 40 and movement of the rack 73 to the flapper is preferably substantially free from frictional resistance and lost motion. In the present embodiment this is accomplished by having the bell cranks and the shaft 129 loosely mounted in their respective supports and by having the connections between the connecting links and the bell cranks also free and loose. Thus friction is reduced to a point where it does not interfere with the movement of the parts.

The linkage also is free from lost motion. The parts are light in weight and hang on their respective supports which are all concave curved surfaces that always center the parts in the same centers. Thus there is no side play such as would introduce lost motion.

The rack 73 supported between the two spring bellows also moves without any undue frictional resistance.

Different positions of the linkage mechanism are shown in Figures 15 through 18. In Figure 15, the linkage is shown (as in Figure 7) with the control point set substantially in the center. Preferably liquid level also is at the desired level. Preferably when in this position the arms 120 and 122 of the bell cranks are parallel and the connecting link 121 is perpendicular to arms 120 and 122 so that movement of the distributing link 100 clockwise or counter-clockwise, produces equal movement of the arms 120 and 122 in each direction.

To these ends numerous adjustments of the linkage mechanism are provided. The link 121 is preferably formed of two parts suitably joined (Figure 8) by screws 121a positioned in slots 121b so that the length of the link may be adjusted to make the arms 120 and 122 parallel after the link 120 has been moved to a horizontal position. This connection is permanently secured after this adjustment. During assembly the distributing link 100 is radially adjustable with respect to shaft 40 and the ball-float so that by central positioning of the ball float the distributing link 100 is horizontal. This is a factory adjustment made by adjusting the position of block 47 about shaft 40. Another assembly adjustment is provided by making the length of link 127 adjustable by forming it in two parts held together by screws 127a so that the position of the bell crank 128—129—130 may be adjusted independently of the movement of arms 120 and 122. This adjustment is permanently secured after being made. A fine adjustment between lever 71 and the flapper is provided by the adjustable stop screw 70.

In Figure 16 the position of the parts is shown with the control point shifted to maintain a liquid level above that which would be maintained by the position of the parts in Figure 15.

Figure 18 shows the position of the parts when the control point is set as shown in Figure 15 but with the liquid level above the desired level, thereby causing the distributing link 100 to be rotated clockwise, and arms 120 and 122 to be lowered to move the arm 124 counterclockwise. This, as above described, tends to uncover nozzle 60, so that the pressure in bellows 74 is increased to move rack 73 to the right to maintain the flapper 61 tangent to the nozzle. The increased pressure opens the valve further and as the liquid level moves back toward the control point, the pointer 165 moves back toward the central control point position of pointer 150.

When a tank is inserted in a process to absorb surges in flow, the liquid level controller used in connection with the tank is adjusted to have a reasonably wide throttling range so that surges in the flow into the tank are absorbed and the flow out is made more uniform. To this end the mechanical advantage of the linkage as shown in the drawings is such that deviation of the liquid level from the control point produces only a relatively small movement of arm 124 and a consequent relatively small proportional change of pressure in bellows 74 and consequent movement of rack 73 to keep the flapper 61 tangent to the nozzle 60.

But in instances where a tank is so used as to require a substantially constant liquid level, it is desirable to adjust the controller to give it a narrower throttling range so the same deviation of the ball float will cause much larger proportional change in pressure in bellows 74, to keep the nozzle and flapper tangent. To accomplish this as shown in Figure 7, the connecting link 121 is adjustably connected to arms 120 and 122 by means of a spring clip arrangement shown in Figure 9 wherein a spring 121c is adapted to engage notches 121d positioned along the bottom edges of the arms 120 and 122. Movement of the link 121 to the right along the arms 120 and 122 decreases the throttling range. The throttling range may also be changed by shifting the position of link 127 with respect to arm 124.

Although it is desirable to have a fairly wide throttling range, it is often desirable, in the event that the level so diverges from the control point as to approach the limits of the control instrument, to have the throttling range suddenly narrowed to provide a fast throttling safety action. To this end as shown in Figures 10, 11 and 12, there is mounted on shaft 129, a pivoted bell crank comprising an arm 175 and an arm 176, both mounted on a sleeve 177 freely pivoted about shaft 129. The arm 175 is connected by means of a link 178 to the upper arm 113 of the distributing link 100. The other arm 176 carries at its outer end an extension 179 adjustably secured to the arm 176 by screws 180. The extension 179 carries at its end a yoke member having depending sides 181 and 182 between which lies the upper end of lever 71. Movement of shaft 40 and distributing link 100 pivots the extension member 179 about the axis 129 independently of the movement of the bell crank arms 120 and 122. Movement of shaft 40 moves extension 179 much farther than lever 71 is moved by the same movement of shaft 40. With this mechanism as the liquid level approaches the extremes allowed by the throttling action of the control mechanism, the yoke 179 overtakes the lever 71 and moves it independently of movement of the arms 120 and 122.

Figure 20 shows the range in which it may be desirable to have the yoke 179, which really serves as the fast throttling safety device, come into effect. Figure 17 shows the position of the mechanism when the shaft and its associated parts have moved sufficiently far to bring the safety device into operation. The safety device in effect changes the control instrument, as shown in Figure 20, from a relatively wide throttling to a very narrow or fast throttling control. The levels at which it is desired to have the safety device take effect may be adjusted by lengthening or shortening the arm made up of arms 176 and 179. The longer the arm the narrower is the fast throttling range and the sooner the safety device overtakes lever 71 and narrows the wide throttling range. Shortening of the arm produces the opposite effect.

In the event that it is desired to change the position of the ball-float mechanism to the right-hand rather than the left-hand side of the control mechanism, provision is made to shift the position of the link 127 to the upper end of arm 128 and to shift the link 178 to arm 116 of distributing link 100. In addition it is necessary to reverse the connections from the equalizing valve and to connect the control head to bellows 75 instead of to bellows 74.

I claim—

1. Control apparatus for maintaining a liquid level at a desired level by varying an agent influencing the liquid level comprising a ball-float substantially frictionlessly pivoted on a support, a shaft, the axis of which is coincident with the axis about which the ball-float pivots, said shaft being mounted in a pressure tight bearing, a resilient connection between the shaft and ball float for transmitting rotational movement of the ball-float to the shaft, and means operable by said shaft for varying said agent.

2. Control apparatus for maintaining a liquid level at a desired level by varying an agent influencing the liquid level comprising a ball-float substantially frictionlessly pivoted on a support, a shaft, the axis of which is coincident with the axis about which the ball-float pivots, said shaft being mounted in a substantially frictionless pressure tight bearing, a resilient connection between the shaft and ball-float for transmitting rotational movement of the ball-float to the shaft, a control couple and mechanical linkage connecting said shaft and control couple substantially free of frictional resistance and lost motion.

3. Control apparatus for maintaining a liquid level at a desired level by varying an agent influencing the liquid level comprising a ball-float substantially frictionlessly pivoted on a support, a shaft, the axis of which is coincident with the axis about which the ball-float pivots, said shaft being mounted in a substantially frictionless pressure tight bearing, a resilient connection between the shaft and ball-float for transmitting rotational movement of the ball-float to the shaft, a control couple, mechanical linkage connecting said shaft and control couple substantially free of frictional resistance and lost motion, and said linkage mechanism being adjustable to vary the throttling range of the control apparatus.

4. Control apparatus for maintaining a liquid level at a desired level by varying an agent influencing the liquid level comprising a ball-float substantially frictionlessly pivoted on a support, a shaft, the axis of which is coincident with the axis about which the ball-float pivots, said shaft being mounted in a substantially frictionless pressure tight bearing, a resilient connection between the shaft and ball-float for transmitting rotational movement of the ball-float to the shaft, a control couple, mechanical linkage connecting said shaft and control couple substantially free of frictional resistance and lost motion, said linkage mechanism being adjustable to vary the throttling range of said control apparatus, and means for converting said control mechanism into an open and shut control as the limits of the throttling range are approached.

5. Apparatus for measuring a liquid level in a tank comprising a sealed float chamber having a vertical portion and a connecting horizontal portion, said chamber being so connected with said tank that the level in said tank seeks the same level in the float chamber, a ball float in the vertical portion of said float chamber, a rod extending from said float in to the horizontal portion of said chamber, a rack intermediate the ends of said rod, and a downwardly opening notch provided in said rack; a supporting arm in said horizontal portion extending from the wall thereof, a knife edge bearing support mounted on said supporting arm and adapted to coact with the notch of said rack to support said rod rotatably, a rotatable shaft extending through said float chamber axially aligned with the knife edge of said knife edge bearing support and a resilient connection between said rack and shaft aligned in a plane containing said knife edge and the axis of said shaft.

6. Apparatus for measuring a liquid level in a tank comprising a sealed chamber so connected with said tank that the liquid level in said tank seeks the same level in said chamber, a ball float, a rod extending from said float into said chamber, a rack intermediate the ends of said rod, and a downwardly opening notch provided in said rack; a supporting arm extending from the wall of said sealed chamber, a knife edge bearing support mounted on said supporting arm and adapted to coact with the notch of said rack to support said rod rotatably, a rotatable shaft extending through said float chamber axially aligned with a knife edge of said knife edge bearing support and a resilient connection between said rack and shaft aligned in a plane containing said knife edge and the axis of said shaft.

7. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable motion transmission element extending from the interior to the exterior of said float arm housing and arranged with its axis of oscillation substantially in alignment with the pivotal axis of said pivotal mounting, means for transmitting movement of said float arm to said transmission element, comprising a leaf spring of tortuous shape, and means for locking said float arm in a rigid position with the elements of said pivotal mounting separated, comprising an arcuate serrated element on said float arm, a projection on said float arm housing normally spaced therefrom, and means engageable with said arcuate element and operable to engage the teeth thereof with said projection.

8. In a liquid level responsive device, a float arm housing, a float arm, a float thereon, a substantially friction free pivotal mounting for said float arm, comprising a knife-edge bearing, counterbalance means within said float arm housing for said float arm and float, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring of tortuous shape having a portion extending at substantially right angles to said axes, and means for locking said float arm in a rigid position with the elements of said pivotal mounting separated, comprising a set screw engageable with said float arm to move it to a position engaging a portion of said float arm housing.

9. In a liquid level responsive device, a float arm housing, a float arm, a float thereon, a substantially friction free pivotal mounting for said float arm, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring, and means for locking said float arm in a rigid position with the elements of said pivotal mounting separated, comprising an arcuate serrated element on said float arm, a projection on said float arm housing normally spaced therefrom, and a set screw engageable with said arcuate element and operable to engage the teeth thereof with said projection.

10. In a liquid level responsive device, a float arm housing, a float arm, a float thereon, a substantially friction free pivotal mounting for said float arm, comprising a knife-edge bearing, an oscillatable transmission element extending from the interior to the exterior of said float arm housing and arranged with its axis of oscillation substantially in alignment with the pivotal axis of said pivotal mounting, means for transmitting movement of said float arm to said transmission element, and means for locking said float arm in a rigid position with the elements of said pivotal mounting separated, comprising an arcuate serrated element on said float arm, a projection on said float arm housing normally spaced therefrom, and means engageable with said arcuate element and operable to engage the teeth thereof with said projection.

11. In a liquid level responsive device, a float arm housing, a float arm, a float thereon, a substantially friction free pivotal mounting for said float arm, an oscillatable transmission element extending from the interior to the exterior of said float arm housing and arranged with its axis of oscillation substantially in alignment with the pivotal axis of said pivotal mounting, means for transmitting movement of said float arm to said transmission element, comprising a leaf spring, and means for locking said float arm in a rigid position with the elements of said pivotal mounting separated.

12. In a liquid level responsive device, a float arm housing, a float arm, a float thereon, a substantially friction free pivotal mounting for said float arm, a movable transmission element extending from the interior to the exterior of said float housing, and means for transmitting movement of said float arm to said transmission element comprising a leaf spring.

13. Apparatus for controlling the level of liquid in a tank comprising, in combination, means responsive to the level of liquid in the tank, means for regulating the flow of liquid affecting the level in the tank, and mechanism operative responsively to the first means for controlling actuation of the regulating means, said mechanism having a relatively wide throttling range providing for such actuation of the regulating means as to maintain the flow substantially uniform and permitting variation of the level of liquid within relatively wide limits from a predetermined level which the mechanism seeks to maintain, said mechanism including means effective upon the liquid level reaching said limits to change the operation of the instrument to a faster throttling one thereby providing for such actuation of the regulating means that the liquid level is prevented from varying appreciably beyond said permissible limits of variation.

14. Apparatus for controlling the level of liquid in a tank comprising, in combination, means responsive to the level of liquid in the tank, means for regulating the flow of liquid affecting the level in the tank, and mechanism operative responsively to the first means for controlling actuation of the regulating means, said mechanism having a relatively wide throttling range providing for such actuation of the regulating means as to maintain the flow substantially uniform and permitting variation of the level of liquid within relatively wide limits from a predetermined level which the mechanism seeks to maintain, said mechanism including means effective upon the liquid level reaching said limits to change the operation of the instrument to a faster throttling one thereby providing for such actuation of the regulating means that the liquid level is prevented from varying appreciably beyond said permissible limits of variation, and means for adjusting the limits of level variation at which said last-named means becomes effective.

15. Apparatus for controlling the level of liquid in a tank comprising, in combination, means responsive to the level of liquid in the tank, means for regulating the flow of liquid affecting the level in the tank, and mechanism operative responsively to the first means for controlling actuation of the regulating means, said mechanism including means for establishing a control point corresponding to a predetermined level of liquid in the tank which the mechanism through said regulating means seeks to maintain, the mechanism having a relatively wide throttling range providing for such actuation of the regulating means that the flow is maintained substantially uniform while permitting liquid level to vary between relatively wide limits from the predetermined level but always tending to return the liquid level to the control point.

16. Apparatus for controlling the level of liquid in a tank comprising, in combination, means responsive to the level of liquid in the tank, means for regulating flow affecting the level in the tank, and mechanism operative responsively to the first means for controlling actuation of the regulating means, said mechanism including means for establishing a control point corresponding to a predetermined level of liquid in the tank which the mechanism through the regulating means seeks to maintain, the mechanism having a relatively wide throttling range providing for such actuation of the regulating means that the level of liquid in the tank may vary within relatively wide limits from the predetermined level, said mechanism further including means operative upon the liquid level reaching said limits to change the wide throttling range to a narrow range thereby providing such actuation of the regulating means that the liquid level is prevented from varying appreciably beyond said permissible limits of variation.

17. Apparatus for controlling the level of liquid in a tank, comprising in combination means responsive to the liquid level in the tank, means for regulating flow of fluid affecting the level in the tank, mechanism for controlling the actuation of said regulating means, said mechanism including means for establishing a control point thereby to establish a predetermined value or control point of said liquid level which the mechanism through the regulating means seeks to maintain, and a leverage system including a first arm movable responsively to the first means, a second arm movable responsively to the first arm, the effective length of said arms determining the throttling range of said mechanism, and provisions for adjusting the effective length of said arms to adjust the trottling range as desired.

18. Control apparatus for controlling the level of liquid in a tank comprising in combination, means responsive to the level of liquid in the tank, means for regulating flow of liquid affecting the level in the tank, mechanism for controlling the actuation of said regulating means, said mechanism including a leverage system having a first arm movable responsively to the first means about a positionable axis whose position determines the control point of the mechanism and thereby establishes a predetermined level of liquid in the tank which said mechanism through said regulating means seeks to maintain, a second arm movable about a second axis, a link extending between said arms for transmitting movement of the first arm to the second arm, the effective length of said arms being adjustable and determining the throttling range of the mechanism, and means for positioning the first axis to set the control point of the mechanism.

19. Control apparatus for controlling the level of liquid in a tank comprising in combination, means responsive to the level of liquid in the tank, means for regulating flow of liquid affecting the level in the tank, mechanism for controlling the actuation of said regulating means, said mechanism including a leverage system having a first arm movable responsively to the first means about a positionable axis whose position determines the control point of the mechanism and thereby establishes a predetermined level of liquid in the tank which said mechanism through said regulating means seeks to maintain, a second arm movable about a second axis, a link extending between said arms for transmitting movement of the first arm to the second arm, the effective length of said arms being adjustable and determining the throttling range of the mechanism by moving the link therealong, and means for positioning the first axis whereby to set the control point of the mechanism.

20. Control apparatus for controlling the level of liquid in a tank comprising in combination, means responsive to the level of liquid in the tank, means for regulating flow of liquid affecting the level in the tank, mechanism for controlling the actuation of said regulating means, said mechanism including a leverage system having a first arm movable responsively to the first means about a positionable axis whose position determines the control point of the mechanism and thereby establishes a predetermined level of liquid in the tank which said mechanism through said regulating means seeks to maintain, a second arm movable about a second axis, a link extending between said arms for transmitting movement of the first arm to the second arm, the effective length of said arms being adjustable and determining the throttling range of the mechanism, means for positioning the first axis whereby to set the control point of the mechanism, and normally ineffective means which are rendered effective as the limits of the said throttling range are reached to narrow the throttling range.

CLESSON E. MASON.